(12) United States Patent
Isono

(10) Patent No.: US 9,038,380 B2
(45) Date of Patent: May 26, 2015

(54) MASTER CYLINDER DEVICE

(75) Inventor: Hiroshi Isono, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 475 days.

(21) Appl. No.: 13/582,827

(22) PCT Filed: Jun. 15, 2011

(86) PCT No.: PCT/JP2011/063642
§ 371 (c)(1),
(2), (4) Date: Sep. 5, 2012

(87) PCT Pub. No.: WO2011/158850
PCT Pub. Date: Dec. 22, 2011

(65) Prior Publication Data
US 2012/0324883 A1 Dec. 27, 2012

(30) Foreign Application Priority Data
Jun. 16, 2010 (JP) .................................. 2010-136895

(51) Int. Cl.
*B60T 13/14* (2006.01)
*B60T 8/40* (2006.01)

(52) U.S. Cl.
CPC ............. *B60T 13/144* (2013.01); *B60T 8/4077* (2013.01)

(58) Field of Classification Search
CPC ..... B60T 8/326; B60T 8/3265; B60T 13/686; B60T 11/224
See application file for complete search history.

(56) References Cited

U.S. PATENT DOCUMENTS 5,713,640 A * 2/1998 Feigel et al. .................... 60/545
8,186,772 B2 * 5/2012 Suzuki et al. ............... 303/114.1

FOREIGN PATENT DOCUMENTS

| JP | 2 279450 | 11/1990 |
|---|---|---|
| JP | 9 86363 | 3/1997 |
| JP | 2002 362352 | 12/2002 |
| JP | 2005 162132 | 6/2005 |
| JP | 2006 282001 | 10/2006 |
| WO | 2011 096039 | 8/2011 |

OTHER PUBLICATIONS

U.S. Appl. No. 13/518,171, filed Jun. 21, 2012, Miyazaki et al.
International Search Report Issued Sep. 13, 2011 in PCT/JP11/63642 Filed Jun. 15, 2011.

* cited by examiner

*Primary Examiner* — Thomas E Lazo
(74) *Attorney, Agent, or Firm* — Oblon, McClelland, Maier & Neustadt, L.L.P.

(57) ABSTRACT

A master cylinder device includes: a first pressurizing piston including a main body portion which defines a first pressurizing chamber for pressurizing a brake fluid, and a flange portion which is formed around an outer circumference of the main body portion and in front of which there is defined an opposing chamber; and an input piston which can be shrunk by operating a brake pedal. The master cylinder device further includes an electromagnetic open/close valve for making the opposing chamber and the inter-piston chamber communicate with a reservoir, and an electromagnetic open/close valve for prohibiting the shrink of the input piston. The master cylinder device with such a structure allows a pressurization of the brake fluid depending on an operation force in a state in which the shrink of the input piston is prohibited.

12 Claims, 7 Drawing Sheets

MASTER CYLINDER DEVICE

TECHNICAL FIELD

The present invention relates to a master cylinder device for pressurizing a brake fluid and supplying the brake fluid to a brake device provided in a wheel.

BACKGROUND ART

Recently, in a hydraulic brake system of a vehicle, for example, as described in the following Patent Document 1, a master cylinder device that is normally actuated so as to pressurize a brake fluid depending only on a pressure of the highly pressured brake fluid which is introduced from a high pressure source, is employed. The master cylinder device commonly has a stroke simulator. According to an operation force applied to an operation member by a driver, the stroke simulator allows a movement of the operation member while generating an operation reaction force against the operation force. Therefore, even when the brake fluid is not pressurized depending on the operation force, the driver can realistically feel the operation reaction force while moving the operation member by a driver's brake operation. Thus, the stroke simulator can make operational feeling in a brake operation be favorable even when the master cylinder device pressurizes the brake fluid depending only on the pressure of the brake fluid highly pressurized by the high pressure source. However, under a condition in which the high pressure source cannot work normally due to an electric failure, etc., the master cylinder device cannot be actuated so as to pressurize the brake fluid depending only on the pressure of the brake fluid highly pressurized by the external high pressure source. For this reason, the master cylinder device also has a function for pressurizing the brake fluid depending only on the operation force of the driver.

Patent Literature 1: JP-A-2-279450

DISCLOSURE OF THE INVENTION

(A) Summary of the Invention

Even when the above mentioned cylinder device is actuated so as to pressurize the brake fluid depending only on the operation force, the stroke simulator is put in a state in which it can function. Accordingly, the movement of the operation member owing to the stroke simulator is allowed, and an operation amount of the brake operation member in a brake operation becomes comparatively large. Therefore, operational feeling in a brake operation is deteriorated. Such a deterioration of operational feeling is one example of problems which a master cylinder device with a stroke simulator has, and the master cylinder device has a variety of problems other than it. Therefore, it is possible to carry out a variety of improvements, thereby enhancing utility of the master cylinder device. This invention has been made in the light of such a fact, and it is therefore an object of the invention to provide a master cylinder device with enhanced utility.

To achieve the object, a master cylinder device according to the present invention includes: (A) a pressurizing piston which includes a main body portion in front of which there is defined a pressurizing chamber for pressurizing a brake fluid, and a flange portion formed around an outer circumference of the main body portion, and which is disposed such that, in the rear of the flange portion, there is defined an input chamber into which a brake fluid is introduced from a high pressure source, and, in front of the flange portion, there is defined an opposing chamber filled with a brake fluid and opposing to the input chamber; (B) an input piston which can shrink by operating an operation member, and which is disposed such that, in front of the input piston and between the input piston and the pressurizing piston, there is defined an inter-piston chamber; and (C) a reaction force generating mechanism which generates an elastic reaction force against the shrink of the input piston. Furthermore, the master cylinder device includes a low-pressure-source communicating device for making the opposing chamber and the inter-piston chamber communicate with a low pressure source so as to allow the input piston to come into abutting contact with the pressurizing piston, and an input-piston-shrink prohibiting mechanism for prohibiting the shrink of the input piston.

In the master cylinder device according to the present invention, when the abutting contact of the input piston with the pressurizing piston is allowed by the low-pressure-source communicating device, an operation force applied to the operation member is transmitted to the pressurizing piston. Moreover, when the shrink of the input piston is prohibited by the input-piston-shrink prohibiting mechanism, the operation force can be transmitted to the pressurizing piston in a state in which a stroke simulator does not function and movement of the operation member owing to the stroke simulator is prohibited. Whereby, the brake fluid in the pressurizing chamber can be pressurized depending on the operation force. Therefore, the brake fluid in the pressurizing chamber can be pressurized in a comparatively small operation amount, thus operational feeling becomes favorable. This can enhance utility of the master cylinder device.

(B) Forms of Claimable Invention

There will be exemplified and explained various forms according to an invention which is considered claimable (hereinafter referred to as "claimable invention" where appropriate). Each of the forms of the invention is numbered like the appended claims and depends from the other form or forms, where appropriate. This is for easier understanding of the claimable invention, and it is to be understood that combinations of constituent elements that constitute the invention are not limited to those described in the following forms. That is, it is to be understood that the claimable invention shall be construed in the light of the following descriptions of various forms and preferred embodiments. It is to be further understood that any form in which one or more elements is/are added to or deleted from any one of the following forms may be considered as one form of the claimable invention.

In the following forms, the forms (1)-(12) correspond to claim 1-12, respectively.

(1) A master cylinder device which supplies a pressurized brake fluid to a brake device provided in a wheel and actuated by a pressure of the brake fluid, comprising:
  a housing whose front side is closed;
  a pressurizing piston having a blind hole opening at a rear end thereof, which includes a main body portion, and a flange portion formed around an outer circumference of the main body portion, and which is disposed in the housing such that; in front of the main body portion, there is defined a pressurizing chamber for pressurizing the brake fluid to be supplied to the brake device; in the rear of the flange portion, there is defined an input chamber into which a brake fluid is introduced from a high pressure source and which has a ring shape; and, in front of the flange portion, there is defined an opposing chamber filled with a brake fluid, opposing to the input chamber with the flange portion interposed therebetween, and having a ring shape;

an input piston which is fitted in the blind hole of the pressurizing piston such that, in front of the input piston and between the input piston and the pressurizing piston, there is defined an inter-piston chamber filled with a brake fluid, which is connected to an operation member at a rear end portion thereof, and which is allowed to shrink by operating the operation member;

a reaction force generating mechanism for generating an elastic reaction force against the shrink of the input piston; and an inter-chamber communication passage for making the opposing chamber and the inter-piston chamber communicate with each other so as to enable a mutual absorption of respective volume changes of the opposing chamber and the inter-piston chamber, the volume changes being caused by a forward and a rearward movements of the pressurizing piston, wherein the master cylinder device is configured such that, normally, in a state in which the opposing chamber and the inter-piston chamber communicating with each other by the inter-chamber communication passage are hermetically closed and an operation force applied to the operation member is not transmitted from the input piston to the pressurizing piston, the pressurizing piston pressurizes the brake fluid in the pressurizing chamber depending on a pressure of the brake fluid introduced from the high pressure source while the elastic reaction force generated by the reaction force generating mechanism is permitted to serve as an operation reaction force against an operation of the operation member, wherein the master cylinder device further comprises an operation-force-dependent-pressurization realizing mechanism which, under a condition in which the pressure of the brake fluid introduced from the high pressure source is insufficient, allows the transmission of the operation force from the input piston to the pressurizing piston, thereby realizing a pressurization of the brake fluid in the pressurizing chamber that depends on the operation force, and wherein the operation-force-dependent-pressurization realizing mechanism includes:

a low-pressure-source communicating device for making the opposing chamber and the inter-piston chamber communicate with a low pressure source so as to allow the input piston to come into abutting contact with the pressurizing piston; and an input-piston-shrink prohibiting mechanism for prohibiting the shrink of the input piston.

In the master cylinder device constructed as the above, respective pressures of the brake fluids in the inter-piston chamber and the opposing chamber communicating with each other by the inter-chamber communication passage become equal. Therefore, for example, where a pressurized area of the flange portion of the pressurizing piston on which a pressure of the brake fluid in the opposing chamber acts and a pressurized area of the input piston on which a pressure of the brake fluid in the inter-piston chamber acts are approximately equal, a force applied to the pressurizing piston so as to move it forward and a force applied to the pressurizing piston so as to move it rearward, which are generated by the pressures of the brake fluids in the inter-piston chamber and the opposing chamber, become approximately equal. Accordingly, the pressurizing piston hardly move, even when the pressures of the brake fluids in the inter-piston chamber and the opposing chamber change. Therefore, even when the operation force applied to the operation member by a driver is transmitted via the input piston to the brake fluids in the inter-piston chamber and the opposing chamber, the pressurizing piston hardly move. That is, such a master cylinder device is configured to be normally unable to pressurize the brake fluid in the pressurizing chamber depending on the operation force, in other words, the master cylinder device is configured such that the operation force applied to the operation member is not transmitted to the pressurizing piston.

In the master cylinder device, normally, when the brake fluid is introduced into the input chamber from the high pressure source, the pressurizing piston moves forward depending on a pressure of that brake fluid, and this forward movement pressurizes the brake fluid in the pressurizing chamber. Additionally, this forward movement causes the brake fluid in the opposing chamber to flow into the inter-piston chamber. Therefore, as described above, where the pressurized area of the flange portion of the pressurizing piston and the pressurized area of the input piston are approximately equal, a distance of a movement of the pressurizing piston relative to the housing in a volume change of the opposing chamber and a distance of a movement of the pressurizing piston relative to the input piston in a volume change of the inter-piston chamber are approximately equal. Accordingly, normally, even when the pressurizing piston moves forward by a brake operation depending on the pressure of the brake fluid introduced from the high pressure source, a front end of the input piston defining the inter-piston chamber hardly move.

As described above, in the master cylinder device, normally, a high-pressure-source-pressure dependent pressurizing state, that is, a state in which the master cylinder device is actuated so as to pressurize the brake fluid in the pressurizing chamber, depending on a high-pressure-source pressure that is a pressure of the brake fluid introduced from the high pressure source, is realized. Additionally, during a brake operation, a forward force owing to the operation force is applied to the input piston at the rear end portion in a state in which the front end defining the inter-piston chamber cannot move. Therefore, the input piston is shrank by the operation force, and the reaction force generating mechanism generates the elastic reaction force against the shrink. In the master cylinder device, a stroke simulator includes such a reaction force generating mechanism, and thus the driver can realistically feel the elastic reaction force as the operation reaction force against a brake operation by the driver. At the time, an operation amount of the operation member becomes an amount according to a shrink amount of the input piston.

The master cylinder device also includes the low-pressure-source communicating device, and thus can make the opposing chamber and the inter-piston chamber communicate with the low pressure source, thereby realizing a state in which the opposing chamber and the inter-piston chamber are not hermetically closed. In this state, when the operation force is applied to the operation member, the input piston can move forward while causing the brake fluid in the opposing chamber and the inter-piston chamber to flow to the low pressure source, and the input piston comes into abutting contact with the pressurizing piston. Furthermore, when the shrink of the input piston is prohibited by the input-piston-shrink prohibiting mechanism, the operation force is transmitted to the pressurizing piston in a state in which the input piston cannot shrink, whereby the pressurizing piston is moved forward. That is, it becomes possible to pressurize the brake fluid in the pressurizing chamber, depending on the operation force. In this state, since the shrink of the input piston is prohibited, the operation amount of the operation member becomes an amount according to a movement amount of the pressurizing piston, whereby the operation amount can be comparatively small. As a result, the operation amount does not become larger more than necessary. That can make operational feeling in a brake operation be favorable.

In the master cylinder device, under the condition in which the high pressure source pressure is insufficient, the transmission of the operation force from the input piston to the pressurizing piston is allowed. For example, a condition in which the high pressure source cannot supply the highly pressurized brake fluid due to an electric failure, etc. may be considered as the condition in which the high pressure source pressure is insufficient. In the light of this, it is desirable in the electric failure that the low-pressure-source communicating device is activated to make the opposing chamber and the inter-piston chamber communicate with the low pressure source, and that the input-piston-shrink prohibiting mechanism is activated to prohibit the shrink of the input piston. Where the low-pressure-source communicating device and the input-piston-shrink prohibiting mechanism are activated thus, the driver can perform a brake operation with favorable operational feeling even in the electric failure. As described above, under the condition in which the high pressure source pressure is insufficient in the master cylinder device, a pressurizing state in which the master cylinder device can be actuated so as to pressurize the brake fluid in the pressurizing chamber depending only on the operation force, namely, an operation-force dependent pressurizing state is realized.

The reaction force generating mechanism of the master cylinder device constitutes a part of a so-called stroke simulator, and, as long as it generates the elastic reaction force against the shrink of the input piston, its structure is not particularly limited. For example, the reaction force generating mechanism may be constructed so as to apply the elastic reaction force directly to the input piston, or apply the elastic reaction force indirectly to the input piston by pressurizing a brake fluid filled in an inside of the input piston.

(2) The master cylinder device according to the form (1),
wherein the input piston includes two members one of which is fitted in the other of which such that an internal chamber filled with a brake fluid is defined inside the input piston, and is allowed to shrink by that a relative movement of the two members is allowed, and
wherein the input-piston-shrink prohibiting mechanism is configured to hermetically close the internal chamber so as to prohibit the shrink of the input piston.

In the above structure, the input piston according to this form shrinks owing to the relative movement of the two members. Due to the shrink, a volume of the internal chamber decreases, and then the brake fluid in the internal chamber flows out from the internal chamber. Therefore, the input-piston-shrink prohibiting mechanism can prohibit the outflow of the brake fluid from the internal chamber by hermetically closing the internal chamber, thereby prohibiting the shrink of the input piston.

(3) The master cylinder device according to the form (2),
wherein the input piston is allowed to shrink by that the internal chamber communicates with the low pressure source, and
wherein the input-piston-shrink prohibiting mechanism includes an internal-chamber-communication shut-off device for shutting off the communication of the internal chamber with the low pressure source so as to hermetically close the internal chamber.

A pressure of the brake fluid in the internal chamber acts in a direction in which the shrink of the input piston is prevented, that is, the above two members of the input piston are separated away from each other. In the master cylinder device, normally, since the pressure of the brake fluid in the internal chamber is a pressure of a low pressure source, a force for preventing the shrink of the input piston can be made comparatively small. Therefore, the input piston can shrink comparatively smoothly. Moreover, owing to the above structure, when the communication of the internal chamber with the low pressure source is shut off by the internal-chamber-communication shut-off device, the brake fluid cannot flow out from the internal chamber into the low pressure source, and cannot flow from the low pressure source into the internal chamber. Whereby, a volume change of the internal chamber, that is, the shrink of the input piston can be prohibited.

(4) The master cylinder device according to the form (3),
wherein the internal-chamber-communication shut-off device includes a mechanical open/close valve which is disposed on a communication passage connecting the internal chamber and the low pressure source, into which a pressure of the brake fluid in the opposing chamber and the inter-piston chamber is introduced as a pilot pressure, and which opens when the pilot pressure is not less than a predetermined pressure and closes when the pilot pressure is less than the predetermined pressure.

In the master cylinder device according to this form, the shrink of the input piston is prohibited or allowed depending on the pressure of the brake fluid in the opposing chamber and the inter-piston chamber. In the state in which the opposing chamber and the inter-piston chamber are hermetically closed, when the operation force is transmitted via the input piston to the brake fluids in the opposing chamber and the inter-piston chamber, the pressure of the brake fluids in the opposing chamber and the inter-piston chamber increases. The mechanical open/close valve being the internal-chamber-communication shut-off device of the master cylinder device according to this form utilizes the increase of the pressure of the brake fluids for its opening and closing. The mechanical open/close valve opens when the pressure is not less than the predetermined pressure, thereby making the internal chamber communicate with the low pressure source. In this state, the prohibition of the shrink of the input piston is released. On the other hand, in the state in which the opposing chamber and the inter-piston chamber are made to communicate with a low pressure source, the pressure of the brake fluids in the opposing chamber and the inter-piston chamber never decrease less than the predetermined pressure, whereby the mechanical open/close valve is maintained in a closed state.

Incidentally, it is desirable that the predetermined pressure is determined to be as low as possible. Where the predetermined pressure is determined low, the internal chamber can communicate with the low pressure source immediately after a beginning of a brake operation, that is, when the pressure of the brake fluids in the opposing chamber and the inter-piston chamber is increased slightly by an operation force. In other words, this mechanical open/close valve is constituted as a mechanism for making the internal chamber communicate with the low pressure source in response to a brake operation in the state in which the opposing chamber and the inter-piston chamber are hermetically closed. Thus, in the master cylinder device according to this form, the internal-chamber-communication shut-off device is constructed with a comparatively simple mechanism.

(5) The master cylinder device according to the form (3),
wherein the internal-chamber-communication shut-off device includes an electromagnetic open/close valve disposed on a communication passage connecting the internal chamber and the low pressure source.

This form is a form in which the internal-chamber-communication shut-off device is an electromagnetic open/close valve, and it is possible by its opening and closing to switch the allowance and the prohibition of the shrink of the input piston. Incidentally, it is desirable that the electromagnetic open/close valve is a normally closed valve, that is, an open/close valve that comes into a close state when not-energized, and an open state when energized, in order to prohibit the shrink of the input piston in the electric failure, thereby realizing the operation-force dependent pressurizing state.

(6) The master cylinder device according to any one of the forms (3)-(5),
wherein the reaction force generating mechanism is disposed in the internal chamber and includes a spring for biasing the two members in a direction in which the input piston stretches.

For the reaction force generating mechanism, for example, a compression spring can be employed. Where each of both ends of the compression spring is connected to each of the two members of the input piston, the compression spring generates, against the relative movement of the two members causing the shrink of the input piston, an elastic force in a direction opposite to the relative movement. The elastic force acts on each of the two members as a force in a direction in which the input piston stretches.

(7) The master cylinder device according to the form (6),
wherein the reaction force generating mechanism includes
two springs each of which functions as the spring, which are arranged in series in a state in which one end portion of one of the two springs is supported by one of the two members, and one end portion of the other of the two springs is supported by the other of the two members, and whose spring constants are different from each other, and
a floating seat disposed between the other end portion of the one of the two springs and the other end portion of the other of the two springs, floatingly supported by the two springs, and connecting the two springs so as to apply elastic reaction forces of the two springs to the two members.

In the shrink of the input piston in the above structure, the spring with a smaller spring constant deforms larger. Additionally, when the deform of the spring with the smaller spring constant reaches to a limit, only the spring with a larger spring constant deforms while the spring with the smaller spring constant cannot deform further. Accordingly, the master cylinder device can be configured such that, in a range in which the operation amount is comparatively small, the spring with the smaller spring constant deforms mainly, and, in a range in which the operation amount is comparatively large, only the spring with the larger spring constant deforms. Therefore, it is possible to make small an operation-reaction-force inclination indicating a change of the operation force with respect to the operation amount of the operation member in the range in which the operation amount is comparatively small, and it is possible to make large the operation-reaction-force inclination in the range in which the operation amount is comparatively large.

(8) The master cylinder device according to the form (2),
wherein the reaction force generating mechanism includes:
a liquid chamber which communicates with the internal chamber and is filled with a brake fluid, and whose volume change is allowed; and a pressurizing mechanism for elastically pressurizing the brake fluid in the liquid chamber, and
wherein the input-piston-shrink prohibiting mechanism includes an internal-chamber-communication shut-off device for shutting off the communication of the internal chamber with the liquid chamber so as to hermetically close the internal chamber.

The reaction force generating mechanism constructed above constitutes a so-called accumulator type stroke simulator, in which a pressure of the brake fluid in the liquid chamber pressurized by the pressurizing mechanism is transmitted to the brake fluid in the internal chamber, thereby acting on the input piston as the elastic reaction force against the shrink of the input piston, that is, the operation reaction force against an operation of the operation member. Moreover, in the above structure, when the internal-chamber-communication shut-off device shuts off the communication of the internal chamber with the liquid chamber, the brake fluid cannot flow out from the internal chamber into the liquid chamber, and cannot flow from the liquid chamber into the internal chamber. Whereby, a volume change of the internal chamber, that is, the shrink of the input piston can be prohibited.

(9) The master cylinder device according to any one of the forms (1)-(8),
wherein the low-pressure-source communicating device includes an electromagnetic open/close valve disposed on a communication passage connecting the opposing chamber and the inter-piston chamber to the low pressure source.

This form is a form in which the low-pressure-source communicating device is an electromagnetic open/close valve, and it is possible by its opening and closing to switch the allowance and the prohibition of the communication of the opposing chamber and the inter-piston chamber with the low pressure source. Incidentally, it is desirable that the electromagnetic open/close valve is a normally open valve, that is, an open/close valve that comes into an open state when not-energized and a close state when energized, so as to allow the abutting contact of the input piston with the pressurizing piston in the electric failure, thereby realizing the operation-force dependent pressurizing state.

(10) The master cylinder device according to any one of the forms (1)-(9),
wherein the master cylinder device is configured such that, when the operation member is not operated, an front end of the input piston and a bottom portion of the blind hole of the pressurizing piston are apart from each other.

(11) The master cylinder device according to the form (10),
wherein a distance between the front end of the input piston and the bottom portion of the blind hole of the pressurizing piston is not more than one-fifth of an internal diameter of the blind hole.

In the master cylinder device according to the above forms, even when the operation member is operated in the above mentioned operation-force dependent pressurizing state, the brake fluid in the pressurizing chamber cannot be pressurized by the operation force until the input piston comes into abutting contact with the pressurizing piston. So to say, as regards this master cylinder device, there is provided an idle distance in a beginning of a brake operation, in other words, there is provided a state in which an operation of the operation member by the operation force cannot actuate the brake device. That is, the idle distance is considered as a "play" in a brake operation.

In the light of that the master cylinder device is actuated in the operation-force dependent pressurizing state, it is desirable that, when the operation member is not operated, the distance between the input piston and the pressurizing piston is comparatively short. In particular, it is more desirable that the distance is not more than one-tenth of the internal diameter of the blind hole. In an extreme sense, the distance may be zero. As mentioned above, in the operation-force dependent pressurizing state, the brake fluid in the pressurizing chamber is pressurized in the state in which the input piston is in abutting contact with the pressurizing piston. Therefore, where the distance between the input piston and the pressurizing piston is set comparatively short, immediately after a beginning of a brake operation, the input piston can come into abutting contact with the pressurizing piston so as to actuate the brake device, thereby pressurizing the brake fluid. Consequently, soon after a brake operation is performed a little, the brake device begins a generation of a brake force, whereby operational feeling in the brake operation becomes favorable.

(12) The master cylinder device according to any one of the forms (1)-(11),
wherein the master cylinder device is configured such that a pressurized area of the flange portion on which a pressure of the brake fluid in the opposing chamber acts and a pressurized area of the input piston on which a pressure of the brake fluid in the inter-piston chamber acts are equal.

In the above structure, for example, where the input piston is constructed with a member for defining the inter-piston chamber and a member to which the operation member is connected, and even when a brake operation is performed in the above high-pressure-source-pressure dependent pressurizing state, as described above, the front end of the input piston which defines the inter-piston chamber does not move relative to the housing. Therefore, a position of the operation member in a brake operation depends on the operation force and the elastic reaction force generated by the reaction force generating mechanism. That is, in a brake operation, the operation member stops at a position where the operation force and the elastic reaction force balance with each other. Therefore, the operation member is not moved in accordance with a position of the pressurizing piston, whereby a driver can perform a brake operation without sensing unfavorable feeling which might be caused if the operation member were moved.

BEST MODE FOR CARRYING OUT THE INVENTION

There will be described in detail some embodiments according to the claimable invention with reference to the drawings. It is to be understood, however, that the claimable invention is not limited to the following embodiments and modified embodiment but may be embodied with various changes and modifications on the basis of knowledge of those skilled in the art.

First Embodiment

Structure of Vehicle

Figure 1:
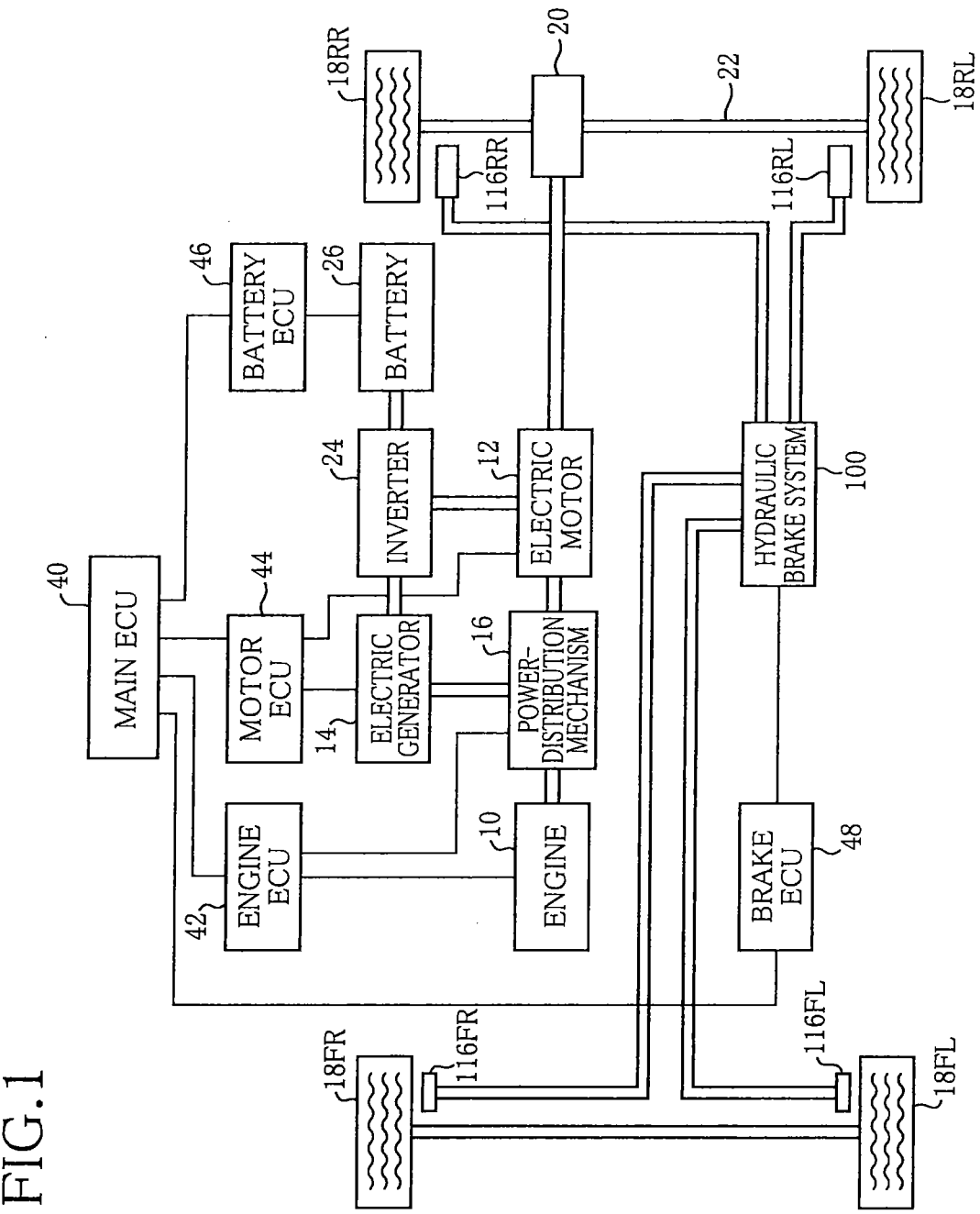
FIG. 1 is a schematic view of a drive system and a brake system of a hybrid vehicle equipped with a master cylinder device of a first embodiment according to the claimable invention.

FIG. 1 schematically illustrates a drive system and a brake system of a hybrid vehicle which is equipped with a master cylinder device of a first embodiment. The vehicle is equipped with an engine 10 and an electric motor 12 as sources of power, and also equipped with an electric generator 14 which generates electricity by an output power of the engine 10. The engine 10, the electric motor 12, and the electric generator 14 are connected to one another via a power-distribution mechanism 16. By controlling the power-distribution mechanism 16, the power of the engine 10 can be divided into a power for driving the electric generator 14 and a power for rotating drive wheels among four wheels 18, and a power of the electric motor 12 can be transmitted to the drive wheels. In other words, the power-distribution mechanism 16 functions as a speed-change mechanism with respect to a driving power which is transmitted to the drive wheels via a speed reducer 20 and a drive shaft 22. It is noted that, while some of components such as the wheels 18 are collectively described, a suitable one of suffixes "FL", "FR", "RL", "RR" respectively indicative of a front left wheel, a front right wheel, a rear left wheel, and a rear right wheel is attached to the numerals of a component element, where it is needed to indicate which one of the four wheels the component corresponds to. According to the description of the suffixes, the drive wheels of the vehicle are the wheel 18RL and the wheel 18 RR.

The electric motor 12 is an alternate current (AC) synchronous motor and is driven by AC electricity. The vehicle is equipped with an inverter 24 which can change electricity of direct current to electricity of alternate current and vice versa. Therefore, by controlling the inverter 24, electricity of alternate current generated by the electric generator 14 can be inverted into electricity of direct current for being charged in a battery 26, and electricity of direct current charged in the battery 26 can be inverted into electricity of alternate current for driving the electric motor 12. The electric generator 14 is constructed as an AC synchronous motor, like the electric motor 12. Accordingly, it may be considered that the vehicle with the present embodiment has two AC synchronous motors. One of them is used as the electric motor 12, to mainly output the driving power, and the other of them is used as the electric generator 14 to mainly generate electricity with using the output power of the engine 10.

The electric motor 12 can also generate (regenerate) electricity by using rotations of the wheels 18RL and 18RR in the vehicle running. In regenerating electricity, the electric motor 12 connected to the wheels 18RL and 18RR generates electricity and a resistance force for restraining a rotation of the electric motor 12. Therefore, it is possible to utilize the resistance force as a brake force for braking the vehicle. That is, the electric motor 12 is utilized as means of a regenerative brake which brakes the vehicle with regenerating electricity. Thus, the vehicle is braked by controlling the regenerative brake together with an engine brake and a hydraulic brake, as described below. On the other hand, the electric generator 14 mainly generates electricity with using the output power of the engine 10 and also functions as an electric motor by that electricity is supplied from the battery 26 via the inverter 24.

In the vehicle, the above control of the brakes and other controls in the vehicle are executed by a plurality of electronic control units (ECUs). Among the ECUs, a main ECU 40 has a function for supervising the execution of these controls. For instance, the hybrid vehicle can run by a drive of the engine 10 and a drive of the electric motor 12, which are synthetically controlled by the main ECU 40. More specifically, the main ECU 40 determines a ratio between the output power of the engine 10 and an output power of the electric motor 12, and, on the basis of the ratio, the main ECU 40 sends, to an engine ECU 42 for controlling the engine 10 and a motor ECU 44 for controlling the electric motor 12 and the electric generator 14, commands regarding their respective controls.

A battery ECU 46 for controlling the battery 26 is also connected to the main ECU 40. The battery ECU 46 monitors an electric charge state of the battery 26, and sends a charge-request command to the main ECU 40 when an electric charge amount is short. When the main ECU 40 receives the charge-request command, the main ECU 40 sends, to the motor ECU 44, a command of generating electricity by the electric generator 14 in order to charge the battery 26.

A brake ECU 48 is also connected to the main ECU 40. The vehicle is equipped with a brake operation member (hereinafter, referred to as an "operation member", where appropriate) which is operated by a driver. The brake ECU 48 determines a target brake force on the basis of at least one of a brake operation amount (hereinafter, referred to as an "operation amount", where appropriate) which is an amount of operation of the operation member and a brake operation force (hereinafter, referred to as an "operation force", where appropriate) which is a force that is applied to the operation member by the driver, and sends the target brake force to the main ECU 40. The motor ECU 44 controls the regenerative brake on the basis of the target brake force and sends, to the main ECU 40, an execution value, that is, a value of the regenerative brake force which is being generated. In the main ECU 40, the regenerative brake force is subtracted from the target brake force, and a target hydraulic brake force which should be generated in a hydraulic brake system 100 mounted on the vehicle is determined on the basis of the subtracted value. The main ECU 40 sends the target hydraulic brake force to the brake ECU 48, and the brake ECU 48 then controls the hydraulic brake system 100 such that a hydraulic brake force generated by the hydraulic brake system 100 becomes equal to the target hydraulic brake force.

Structure of Hydraulic Brake System

The hydraulic brake system 100 provided in the hybrid vehicle constructed as described above will be explained with reference to FIG. 2. In the following description, the terms "forward" and "rearward" are used to indicate the leftward direction and the rightward direction in FIG. 2, respectively. In addition, the terms "front side", "front end", "forward movement", "rear side", "rear end", "rearward movement", etc. are used for similar indication. Incidentally, in the following explanation, characters enclosed in square brackets [ ] represent sensors etc. in the drawings.

Figure 2:
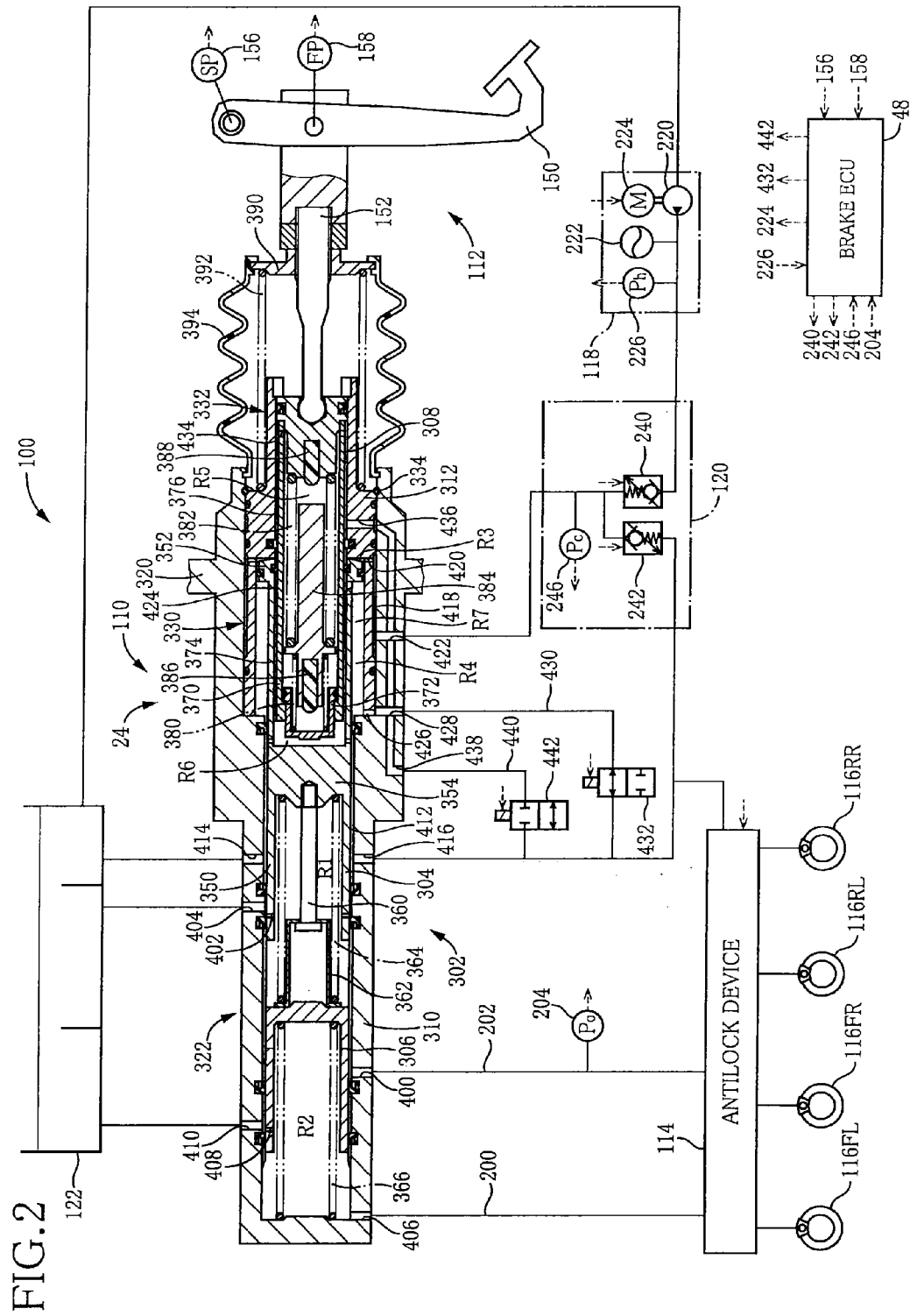
FIG. 2 is a view of a hydraulic brake system including the master cylinder device of the first embodiment.

FIG. 2 schematically represents the hydraulic brake system 100 provided in the vehicle. The hydraulic brake system 100 has a master cylinder device 110 for pressurizing a brake fluid. The driver in the vehicle can actuate the master cylinder device 110 by operating an operation device 112 which is connected to the master cylinder device 110. The master cylinder device 110 pressurizes the brake fluid by its actuation. The pressurized brake fluid is supplied to each of brake devices 116 provided for the respective wheels via an antilock device 114 which is connected to the master cylinder device 110. The brake devices 116 generate respective forces for restraining rotations of the wheels 18, namely, hydraulic brake forces, depending on a pressure of the pressurized brake fluid (hereinafter, referred to as an "output pressure", where appropriate), namely, a master pressure.

The hydraulic brake system 100 has, as a high pressure source, a high-pressure-source device 118 for intensifying a pressure of a brake fluid. The high-pressure-source device 118 is connected to the master cylinder device 110 via a pressure-intensifying/reducing device 120. The pressure-intensifying/reducing device 120 is a device which controls the pressure of the brake fluid intensified by the high-pressure-source device 118 and which intensifies and reduces the pressure of the brake fluid that is inputted to the master cylinder device 110 (hereinafter, referred to as an "input pressure", where appropriate). The master cylinder device 110 is constructed to be able to be actuated according to the intensification and reduction of the input pressure. The hydraulic brake system 100 has a reservoir 122, as a low pressure source, for storing a brake fluid at the atmospheric pressure. The reservoir 122 is connected to the master cylinder device 110, the pressure-intensifying/reducing device 120, and the high-pressure-source device 118.

The operation device 112 includes a brake pedal 150 as an operation member and an operation rod 152 connected to the brake pedal 150. The brake pedal 150 is pivotably held on the body of the vehicle. The operation rod 152 is connected at a rear end portion thereof to the brake pedal 150 and at a front end portion thereof to the master cylinder device 110. The operation device 112 also has an operation amount sensor [SP] 156 for detecting the operation amount of the brake pedal 150 and an operation force sensor [FP] 158 for detecting the operation force. The operation amount sensor 156 and the operation force sensor 158 are connected to the brake ECU 48, which determines the target brake force on the basis of values detected by the sensors.

The brake devices 116 are connected to the master cylinder device 110 via fluid passages 200, 202. The fluid passages 200, 202 are fluid passages for supplying, to the brake devices 116, the brake fluid pressurized at the output pressure by the master cylinder device 110. An output pressure sensor [$P_O$] 204 (that is so-called master pressure sensor) is provided on the fluid passage 202. Though detailed description about the brake devices 116 is abbreviated, each of them includes a brake caliper, a wheel cylinder (brake cylinder) and brake pads which are provided in the brake caliper, and a brake disc which rotates together with the corresponding wheel. Each of the fluid passages 200, 202 is connected to the brake cylinder of each brake device 116 via the antilock device 114. More specifically, the fluid passage 200 is connected to the brake devices 116FL, 116FR for the front wheels, and the fluid passage 202 is connected to the brake devices 116RL, 116RR for the rear wheels. Each of the brake cylinders presses the brake pads onto the brake disk on the basis of the output pressure of the brake fluid pressurized by the master cylinder device 110. In each of the brake devices 116, friction caused by the press generates the hydraulic brake force for restraining rotation of the corresponding wheel. Thus the vehicle is braked.

The antilock device 114 is a common device and, in short, has four pairs of open/close valves corresponding to the respective wheels. One of the open/close valves of each of the pairs is an open/close valve for pressurizing the brake fluid, and is put in an open state, where the corresponding wheel is not locked. The other of them is an open/close valve for depressurizing the brake fluid, and is put in a close state, where the wheel is not locked. The antilock device 114 is constructed such that, when the wheel is locked, the open/close valve for pressurizing the brake fluid shuts off a flow of the brake fluid from the master cylinder device 110 to the brake device 116 and the open/close valve for depressurizing the brake fluid allows a flow of the brake fluid from the brake device 116 to the reservoir, so as to release the lock of the wheel.

The high-pressure-source device 118 includes a hydraulic pump 220 which suctions the brake fluid from the reservoir 122 and intensifies the pressure of the brake fluid, and an accumulator 222 in which the brake fluid whose pressure is intensified is stored. Incidentally, the hydraulic pump 220 is driven by an electric motor 224. The high-pressure-source device 118 has a high-pressure-source pressure sensor [$P_h$] 226 for detecting the pressure of the brake fluid whose pressure is intensified. The brake ECU 48 monitors a value detected by the high-pressure-source pressure sensor 226, and the hydraulic pump 220 is controlled to be driven on the basis of the detected value. Owing to the control, the high-pressure-source device 118 constantly supplies, to the pressure-intensifying/reducing device 120, the brake fluid having a pressure of a predetermined pressure or more.

The pressure-intensifying/reducing device 120 includes an electromagnetic pressure-intensifying linear valve 240 for intensifying the input pressure and an electromagnetic pressure-reducing linear valve 242 for reducing the input pressure. The pressure-intensifying linear valve 240 is provided on a fluid passage extending from the high-pressure-source device 118 to the master cylinder device 110, while the pressure-reducing linear valve 242 is provided on a fluid passage extending from the reservoir 122 to the master cylinder device 110. Incidentally, on the fluid passages, respective portions from the pressure-intensifying linear valve 240 and the pressure-reducing linear valve 242 to the master cylinder device 110 are integrated into a single fluid passage to be connected to the master cylinder device 110. In addition, on the integrated fluid passage, there is provided an input pressure sensor [$P_C$] 246 for detecting the input pressure. The brake ECU 48 controls the pressure-intensifying/reducing device 120 on the basis of a value detected by the input pressure sensor 246.

The pressure-intensifying linear valve 240 is maintained in a close state in which electric current is not supplied thereto, that is, in a not-energized state. When the pressure-intensifying linear valve 240 is supplied with electric current, that is, put into an energized state, the valve 240 opens at a valve-opening pressure which is determined in accordance with the supplied electric current. Incidentally, the pressure-intensifying linear valve 240 is constructed such that the larger the supplied electric current is, the higher the valve-opening pressure is. On the other hand, the pressure-reducing linear valve 242 is maintained in an open state in which electric current is not supplied thereto. In a normal condition, that is, a condition in which electric current can be supplied to the system, the pressure-reducing linear valve 242 is supplied with the maximum electric current in a predetermined range so as to be maintained in a close state. When the supplied electric current is reduced, the valve 242 opens at a valve-opening pressure which is determined in accordance with the supplied electric current. Incidentally, the pressure-reducing linear valve 242 is constructed such that the smaller the supplied electric current is, the lower the valve-opening pressure is.

Structure of Cylinder Device

The master cylinder device 110 includes a housing 302 which is a casing of the master cylinder device 110, a first pressurizing piston 304 and a second pressurizing piston 306 which pressurize the brake fluid to be supplied to the brake devices 116, and an input piston 308 to which the operation of the driver is inputted via the operation device 112. Incidentally, FIG. 2 illustrates a state in which the master cylinder device 110 is not actuated, that is, a brake operation is not performed.

The housing 302 mainly includes two members, concretely, a first housing member 310 and a second housing member 312. The first housing member 310 has a shape like a tube, on the whole, whose front end portion is closed and a flange 320 formed on an outer circumference of a rear end portion thereof. The first housing member 310 is mounted on the body of the vehicle at the flange 320. The first housing member 310 is sectioned into two portions having mutually different inner diameters, concretely, a front small-diameter portion 322 located in a front side and having a small inner diameter, and a rear large-diameter portion 324 located in a rear side and having a large inner diameter.

The second housing member 312 has a shape like a tube which has a front large-diameter portion 330 located in a front side and having a large inner diameter, and a rear small-diameter portion 332 located in a rear side and having a small inner diameter. Between the front large-diameter portion 330 and the rear small-diameter portion 332, there is formed a stepping face owing to a difference of the inner diameters. The second housing member 312 is fitted in the rear large-diameter portion 324 in a state in which a front end of the front large-diameter portion 330 is in contact with a stepping face formed between the front small-diameter portion 322 and the rear large-diameter portion 324 of the first housing member 310. The first housing member 310 and the second housing member 312 are fastened with each other by a lock ring 334 which is fitted in a rear end portion of the first housing portion 310.

The second pressurizing piston 306 has a shape like a tube whose rear end portion is closed, and is slidably fitted in the front small-diameter portion 322 of the first housing member 310. The first pressurizing piston 304 has a shape that has a body portion 350 having a shape like a tube and has a flange portion 352 provided on a rear end portion of the body portion 350. The first pressurizing piston 304 is disposed behind the second pressurizing piston 306. A front portion of the body portion 350 is slidably fitted in a rear portion of an inner circumferential face of the front small-diameter portion 322 of the first housing member 310, and the flange portion 352 is slidably fitted in an inner circumferential face of the front large-diameter portion 330 of the second housing member 312. An inside of the body portion 350 of the first pressurizing piston 304 is sectioned into two portions by a separation wall 354 provided in the middle of the body portion 350 in a forward-rearward direction thereof. That is, the first pressurizing piston 304 has a shape that has two blind holes which open at a front end and a rear end thereof, respectively.

In front of the body portion 350 of the first pressurizing piston 304 and between the body portion 350 and the second pressurizing piston 306, there is defined a first pressurizing chamber R1 for pressurizing the brake fluid to be supplied to the brake devices 116RL, RR provided in the two rear wheels. And in front of the second pressurizing piston 306, there is defined a second pressurizing chamber R2 for pressurizing the brake fluid to be supplied to the brake devices 116FL, FR provided in the two front wheels. Incidentally, a distance in which the first pressurizing piston 304 and the second pressurizing piston 306 separate from each other is limited so as to be within a predetermined range by a headed pin 360 screwed vertically on the separation wall 354 of the first pressurizing piston 304 and a pin-retaining tube 362 fixed on a rear end face of the second pressurizing piston 306. In the first pressurizing chamber R1 and the second pressurizing chamber R2, compression coil springs (hereinafter, referred to as a "return springs", where appropriate) 364, 366 are disposed, respectively. Those springs bias the first pressurizing piston 304 and the second pressurizing piston 306 in directions that the pistons 304, 306 separate away from each other and the pistons 304, 306 are biased rearward.

Behind the first pressurizing piston 304, more specifically, behind the flange portion 352 of the first pressurizing piston 304 and between the flange portion 352 and the stepping face of the second housing member 312, there is defined a fluid chamber into which the brake fluid is supplied from the high-pressure-source device 118, that is, a fluid chamber R3 into which the pressure from the high-pressure-source device 118 is inputted. This fluid chamber R3 is referred to as an "input chamber", where appropriate. It is noted that the input chamber R3 is illustrated in an almost squeezed state in FIG. 2. Additionally, inside the housing 302, there is a space formed between the inner circumferential face of the second housing member 312 and an outer circumferential face of the body portion 350 of the first pressurizing piston 304. The space is defined by a front end face of the flange portion 352 of the first pressurizing piston 304 and the stepping face formed between the front small-diameter portion 322 and the rear large-diameter portion 324, whereby a ring shaped liquid chamber is formed. This liquid chamber is served as an opposing chamber R4 opposing to the input chamber R3 with the flange portion 352 interposed those chambers.

The input piston 308 includes a rear side member 370 which is located in a rear side and has a shape like a tube whose front end portion is opened and whose rear end portion is closed, and a front side member 372 which is located in front of the rear side member 370, whose front end portion is closed, and whose rear end portion is opened. The front side member 372 is fitted in the rear side member 370 so as to slidably contact with an inner circumferential portion of the rear side member 370, and thus the front side member 372 and the rear side member 370 can move relative to each other. That is, the input piston 308 is allowed to stretch and shrink. It is noted that, owing to the relative movement, the front end portion of the front side member 372 is allowed to project from and retract into a front end of the rear side member 370. Incidentally, inside the input piston 308 constructed thus, there is defined a liquid chamber (hereinafter, referred to as an "internal chamber", where appropriate) R5 by the rear side member 370 and the front side member 372.

The input piston 308 is inserted from a rear end side of the housing 302 and in the rear small-diameter portion 332 of the second housing member 312, and is fitted in the blind hole of the first pressurizing piston 304 which opens rearward. In this state, in front of the input piston 308 and between the input piston 308 and the first pressurizing piston 304, there is defined a liquid chamber (hereinafter, referred to as an "inter-piston chamber", where appropriate) R6. Additionally, between the input piston 308 and the first pressurizing piston 304, there is formed a fluid passage 374 having a certain cross section area through which the brake fluid can flow, and also, between the input piston 308 and the second housing member 312, there is formed a fluid passage 376 having a certain cross section area through which the brake fluid can flow.

In the internal chamber R5, there are disposed a first reaction force spring 380 supporting the front side member 372, a second reaction force spring 382 disposed behind the first reaction force spring 380 in series and supporting the rear side member 370, and a floating seat 384 disposed between those reaction force springs 380, 382 and floatingly supported by the reaction force springs 380, 382. The first reaction force spring 380 and the second reaction force spring 382 are compression springs, and bias the front side member 372 in a direction in which the front side member 372 projects from the rear side member 370, that is, a direction in which the input piston 308 stretches, and thus elastically support the front side member 372.

Incidentally, the front side member 372 is caught at a stopped portion provided on an outer circumferential portion of a rear end of thereof by a stopping portion provided on an inner circumferential portion of a front end of the rear side member 370 so as to be limited to project from the rear side member 370 beyond a certain degree. Additionally, in a front end portion of the floating seat 384, there is fitted a cushion rubber 386. Since the cushion rubber 386 comes into abutting contact with a rear side face of the front side member 372, an approach of the front side member 372 and the floating seat 384 to each other is limited in a certain range. Moreover, in the rear end portion of the rear side member 370, there is also fitted a cushion rubber 388. Since the cushion rubber 388 comes into abutting contact with a rear side face of the floating seat 384, an approach of the rear side member 370 and the floating seat 384 to each other is limited in a certain range. That is, the stretch and the shrink of the input piston 308 are limited in a certain degree.

A front end portion of the operation rod 152 is connected to the rear side member of the input piston 308 so as to transmit, to the input piston 308, the operation force applied to the brake pedal 150 and so as to move the input piston 308 forward and rearward in accordance with the operation amount of the brake pedal 150. Incidentally, the rearward movement of the input piston 308 is limited because the rear end portion thereof is stopped by a rear end portion of the rear small-diameter portion 332 of the second housing member 312. In addition, a spring seat 504 shaped like a disc is fixed to the operation rod 152, and a compression coil spring (hereinafter, referred to as a "return spring", where appropriate) 392 is disposed between a spring seat 390 and the second housing member 312. The return spring 392 biases the operation rod 152 rearward. Incidentally, a boot 394 is provided between the spring seat 390 and the housing 302 so as to protect a rear portion of the master cylinder device 110 from dust.

The first pressurizing chamber R1 communicates with the fluid passage 202 connected to the antilock device 114 through a communication hole 400 whose opening is an output port, and communicates with the reservoir 122 through a communication hole 402 provided in the first pressurizing piston 304 and a communication hole 404 whose opening is a drain port while being allowed not to communicate with the reservoir 122. On the other hand, the second pressurizing chamber R2 communicates with the fluid passage 200 connected to the antilock device 114 through a communication hole 406 whose opening is an output port, and communicates with the reservoir 122 through a communication hole 408 provided in the second pressurizing piston 306 and a communication hole 410 whose opening is a drain port while being allowed not to communicate with the reservoir 122. The body portion 350 of the first pressurizing piston 304 has an outer diameter somewhat smaller than an inner diameter of the front small-diameter portion 322 of the first housing member 310. Between the body portion 350 and the front small-diameter portion 322, there is formed a fluid passage 412 having a certain cross section area through which a brake fluid can flow. The fluid passage 412 communicates with the reservoir 122 through a communication hole 414 whose opening is a drain port, and communicates with the exterior through a communication hole 416 whose opening is a connection port. A part of the front large-diameter portion 330 of the second housing member 312 has an outer diameter somewhat smaller than an inner diameter of the first housing member 310. Between the housing members 310, 312, there is formed a fluid passage 418 having a certain cross section area through which a brake fluid can flow. The input chamber R3 is connected to the pressure-intensifying/reducing device 120 through the communication passage 418, a communication hole 420 provided in the second housing member 312, and a communication hole 422 whose opening is an input port.

In the first pressurizing piston 304, there is provided a communication hole 424 as an inter-chamber communication passage for making the opposing chamber R4 and the inter-piston chamber R6 communicate with each other. In the master cylinder device 110, owing to the communication hole 424 and the fluid passage 374, the opposing chamber R4 and the inter-piston chamber R6 are served as a single liquid chamber (hereinafter, referred to as an "reaction force chamber", where appropriate) R7. It is noted that a pressurized area of the flange portion 352 on which a pressure of the brake fluid in the opposing chamber R4 acts and a pressurized area of the input piston 308 on which a pressure of the brake fluid in the inter-piston chamber R6 acts are equal. The reaction force chamber R7 communicates with the exterior thorough a communication hole 426 provided in the second housing member 312 and a communication hole 428 whose opening is a connection port. To the communication hole 428, an external communication passage 430 communicating with the reservoir 122 through the communication hole 416, the fluid passage 412, and the communication hole 414, is connected. Additionally, in the middle of the external communication passage 430, there is provided an electromagnetic open/close valve 432, which is a normally opened valve that comes into an open state when not-energized. In the open state, the reaction force chamber R7 communicates with the reservoir 122.

The internal chamber R5 in the input piston 308 communicates with the exterior through a communication hole 434 provided in the rear side member 370 of the input piston 308, the fluid passage 376, a communication hole 436 provided in the second housing member 312, and a communication hole 438 which is provided in the first housing member 310 and whose opening is a connection port. To the communication hole 438, an external communication passage 440 whose one end is connected to the external communication passage 430 is connected at the other end. In the middle of the external communication passage 440, there is provided an electromagnetic open/close valve 442, which is a normally closed valve that comes into a close state when not-energized. In the close state, the communication of the internal chamber R5 with the reservoir 122 is shut off.

In the master cylinder device 110 constructed thus, when the brake pedal 150 is not operated, a front end of the front side member 372 of the input piston 308 and a bottom portion of the blind hole of the first pressurizing piston 304 separate away from each other. Moreover, a distance of the separation is not more than one-fifth, more specifically, not more than one-tenth of a diameter of the blind hole.

Actuation of Master Cylinder Device

The following explanation is regarding actuation of the master cylinder device 110. In the normal condition, that is, a condition in which the hydraulic brake system 100 can be actuated normally, the open/close valve 432 and the open/close valve 442 are energized to be closed and opened, respectively. Accordingly, the reaction force chamber R7 is hermetically closed and the internal chamber R5 communicates with the reservoir 122. When the driver begins to press the brake pedal 150, the brake operation force is transmitted to the brake fluid in the inter-piston chamber R6, that is, the reaction force chamber R7 via the input piston 308, and a pressure in the reaction force chamber R7 increases. As described above, since the pressurized area of the flange portion 352 and the pressurized area of the input piston 308 are equal, a force applied to the first pressurizing piston 304 so as to move it forward and a force applied to the first pressurizing piston 304 so as to move it rearward which are generated by the pressure of the reaction force chamber R7, become equal. Therefore, even when the pressure of the brake fluid in the reaction force chamber R7 is increased by the operation force, the first pressurizing piston 304 is not moved only by that increase. That is, the master cylinder device 110 is constructed not to pressurize, in the normal condition, the brake fluid in the pressurizing chambers depending on the operation force. In other words, the master cylinder device 110 is constructed such that the operation force applied to the brake pedal 150 is not transmitted to the first pressurizing piston 304.

In order to pressurize the brake fluid in the first pressurizing chamber R1 and the second pressurizing chamber R2 so as to generate the hydraulic brake force in the middle of a brake operation, the pressure generated by the high-pressure-source device 118 is inputted into the input chamber R3. More specifically, in order to generate the hydraulic brake force with a magnitude obtained by subtracting the regenerative brake force from the target brake force, the pressure controlled by the pressure-intensifying/reducing device 120 is inputted into the input chamber R3. The first pressurizing piston 304 is moved forward depending on the pressure of the brake fluid in the input chamber R3, whereby the brake fluid in the first pressurizing chamber R1 is pressurized. Depending on the pressure of the brake fluid in the first pressurizing chamber R1, the second pressurizing piston 306 is moved forward, whereby the brake fluid in the second pressurizing chamber R2 is also pressurized. At the same time, due to the forward movement of the first pressurizing piston 304, the brake fluid in the opposing chamber R4 flows into the inter-piston chamber R6. As described above, since the pressurized area of the flange portion 352 and the pressurized area of the input piston 308 are equal, a distance of a movement of the first pressurizing piston 304 relative to the housing 302 in a volume change of the opposing chamber R4 and a distance of a movement of the first pressurizing piston 304 relative to the input piston 308 in a volume change of the inter-piston chamber R6 are equal to each other. Accordingly, in the normal condition, the input piston 308 does not move due to the forward movement of the first pressurizing piston 304. Thus, in the master cylinder device 110, there is realized, in the normal condition, a state in which the master cylinder device 110 pressurizes the brake fluid in the pressurizing chambers R1, R2 depending on the high-pressure-source pressure, namely, a high-pressure-source-pressure dependent pressurizing state.

In an brake operation in the high-pressure-source-pressure dependent pressurizing state, as regards the input piston 308, the front side member 372 defining the inter-piston chamber R6 cannot move, while the rear side member 370 is applied with a forward force generated by the operation force. Therefore, the input piston 308 is shrunk by that the front side member 372 and the rear side member 370 move relative to each other by the operation force. Against the shrink, the first reaction force spring 380 and the second reaction force spring 382 generate elastic reaction forces. These elastic reaction forces act on the front side member 372 and the rear side member 370 so as to stretch the input piston 308. That is, the first reaction force spring 380 and the second reaction force spring 382, and the floating seat 384 connecting them function as a reaction force generating mechanism for generating the elastic reaction force against the shrink of the input piston 308. In the master cylinder device 110, a stroke simulator is constituted by the reaction force generating mechanism, and thus the driver can realistically feel the elastic reaction force as an operation reaction force against a brake operation by the driver.

As mentioned above, in the high-pressure-source-pressure dependent pressurizing state, since the input piston 308, more specifically, the front side member 372 of the input piston 308 does not move, an operational position of the brake pedal 150 in a brake operation depends on the operation force and the elastic reaction force generated by the reaction force generating mechanism. That is, in a brake operation, the operation amount of the brake pedal 150 comes into an amount according to an amount of the shrink of the input piston 308, and the brake pedal 150 then stops at a position where the operation force and the elastic reaction force balance with each other. Therefore, the brake pedal 150 is not moved according to a position of the first pressurizing piston 304, whereby the driver can perform a brake operation without sensing unfavorable feeling which might be caused by the movement.

Figure 3:
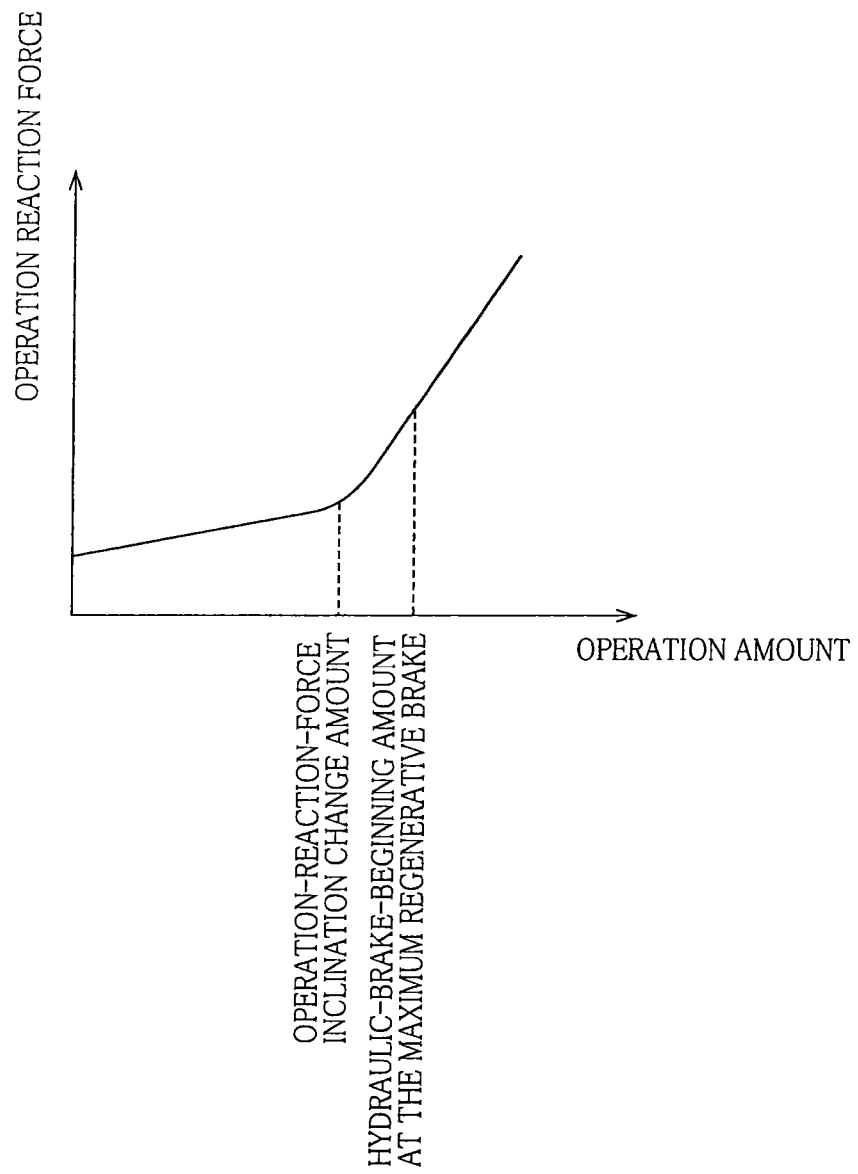
FIG. 3 is a graph which illustrates a relation between an operation amount of an operation member connected to the master cylinder device and an operation reaction force applied from the master cylinder device to the operation member.

FIG. 3 is a graph which illustrates a change of the operation reaction force with respect to an amount of a forward movement of the rear side member 370 of the input piston 308, namely, the operation amount of the brake pedal 150. Hereinafter, this change is referred to as an "operation reaction force inclination", where appropriate. In other words, FIG. 3 is a graph which illustrates operation reaction force characteristics of the master cylinder device 110. It is understood from this figure that, as the operation amount of the brake pedal 150 increases, the operation reaction force increases. When the operation amount of the brake pedal 150 increases beyond a predetermined amount (hereinafter, referred to as an "operation-reaction-force inclination change amount", where appropriate), a change of the operation reaction force with respect to a change of the operation amount becomes large, that is, an increasing inclination of the operation reaction force becomes large. To explain it in detail, in the master cylinder device 110, the first reaction force spring 380 has a spring constant considerably smaller than that of the second reaction force spring 382. Therefore, in a brake operation, a compressed deformation amount of the first reaction force spring 380 becomes considerably larger than that of the second reaction force spring 382. Consequently, when the brake operation amount increases, the front side member 372 comes into abutting contact with the cushion rubber 386 of the floating seat 384, whereby the first reaction force spring 380 is not allowed to deform. When the brake operation amount increases further, the second reaction force spring 382 elastically deforms while the first reaction force spring 380 cannot deform. In the master cylinder device 110, the operation amount at which the first reaction force spring 380 is not allowed to deform is the operation-reaction-force inclination change amount. Therefore, in the master cylinder device 110, the operation reaction force inclination becomes small in a range in which the operation amount is comparatively small and becomes large in a range in which the operation amount is comparatively large. Owing to the operation reaction force characteristics like this, operational feeling in a brake operation is made to be favorable.

As explained above, in the vehicle, the hydraulic brake system 100 should generate the hydraulic brake force with a magnitude obtained by subtracting the regenerative brake force from the target brake force. In an extreme sense, as long as the target brake force can be provided by the regenerative brake force, the hydraulic brake force to be generated by the hydraulic brake system 100 is not required. Here, a maximum regenerative brake force which can be generated by the regenerative brake of the vehicle is defined as an available-maximum-regenerative brake force. Assuming that the hydraulic brake force is generated after a time point when the target brake force exceeds the available-maximum-regenerative brake force, the operation amount of the brake pedal at the beginning of the generation of the hydraulic brake force is generally equal to a hydraulic-brake-beginning amount at the maximum regenerative brake indicated in FIG. 3. In the hydraulic brake system 100, the hydraulic-brake-beginning amount at the maximum regenerative brake is predetermined to be a slightly larger than the above operation-reaction-force inclination change amount. Incidentally, even when the target brake force does not exceed the available-maximum-regenerative brake force, there is an instance in which the hydraulic brake force is required due to the charge amount of the battery 26 and so on. In this instance, before the operation amount reaches the hydraulic-brake-beginning amount at the maximum regenerative brake, the pressure from the high-pressure-source device 118 may be inputted into the input chamber R3.

When the driver stops a brake operation, that is, releases the application of the operation force to the brake pedal 150, the first pressurizing piston 304 and the second pressurizing piston 306 are returned to their respective initial positions (positions illustrated in FIG. 2, that is, positions in a state in which a rear end portion of the first pressurizing piston 304 abuts on the stepping face of the second housing member 312) by the return springs 364, 366. On the other hand, the input piston 308, together with the operation rod 152, is returned to an initial position (a position illustrated in FIG. 2, that is, a position in which a rear end of the rear side member 370 is stopped by the rear end portion of the second housing member 312) by the return spring 392.

Next, The following explanation is regarding actuation of the master cylinder device 110 under a condition in which electricity is not supplied to the hydraulic brake system 100 due to an electric failure. It is noted that the high-pressure-source device 118 cannot intensify the pressure of the brake fluid in the electric failure condition. Under this condition, the open/close valve 432 is not-energized to be opened. Therefore, the reaction force chamber R7 is communicated with the reservoir 122, so that the input piston 308 can move forward while causing the brake fluid in the opposing chamber R7 to flow to the reservoir 122, and comes into abutting contact with the separation wall 354 of the first pressurizing piston 304. That is, the open/close valve 432 functions as a low-pressure-source communicating device for allowing the opposing chamber R4 and the inter-piston chamber R6 to communicate with the reservoir 122 so as to allow the input piston 308 to come into abutting contact with the first pressurizing piston 304. Owing to this abutment, since the operation force is transmitted to the first pressurizing piston 304 via the input piston 308, the open/close valve 432 functions as an operation-force-dependent-pressurization realizing mechanism for realizing the pressurization of the brake fluid in the pressurizing chambers R1, R2 that depends on the operation force.

On the other hand, the open/close valve 442 is not-energized to be closed. Therefore, the open/close valve 442 as an internal-chamber-communication shut-off device shuts off the communication of the internal chamber R5 with the reservoir 122 so that the internal chamber R5 is hermetically closed. Accordingly, since the front side member 372 and the rear side member 370 of the input piston 308 cannot move relative to each other, the input piston 308 is in a state in which its shrink is prohibited. That is, the open/close valve 442 functions as an input-piston-shrink prohibiting mechanism for prohibiting the shrink of the input piston. When a brake operation is performed in this state, the operation amount of the brake pedal 150 becomes an amount according to a movement amount of the first pressurizing piston 304, whereby the operation amount can be comparatively small. As a result, the operation amount does not become larger more than necessary. That can make operational feeling in a brake operation be favorable. Thus, in the master cylinder device 110, where the high-pressure-source device 118 cannot supply the highly pressurized brake fluid, there is realized a state in which the master cylinder device 110 can be actuated so as to pressurize the brake fluid in the pressurizing chambers R1, R2 depending only on the operation force, namely, an operation-force dependent pressurizing state.

In addition, as described above, when the brake pedal 150 is not operated, the front end of the front side member 372 of the input piston 308 and the bottom portion of the blind hole of the first pressurizing piston 304 separate away from each other. Therefore, where the master cylinder device 110 is actuated in the operation-force dependent pressurizing state, in the master cylinder device 110, there is provided an idle distance, namely, a "play" in a beginning of a brake operation, in other words, there is provided a state in which the operation force cannot actuate the brake device. However, in the master cylinder device 110, this idle distance is not more than one-fifth, more specifically, not more than one-tenth of the diameter of the blind hole of the first pressurizing piston 304, and is comparatively short. So, the input piston 308 can come into abutting contact with the first pressurizing piston 304 at a comparatively early stage of a brake operation. Consequently, as regards the master cylinder device 110, soon after the brake pedal 150 is operated a little in the operation-force dependent pressurizing state, the hydraulic brake force begins to be generated, whereby operational feeling in a brake operation is favorable.

Modified Embodiment

Figure 4:
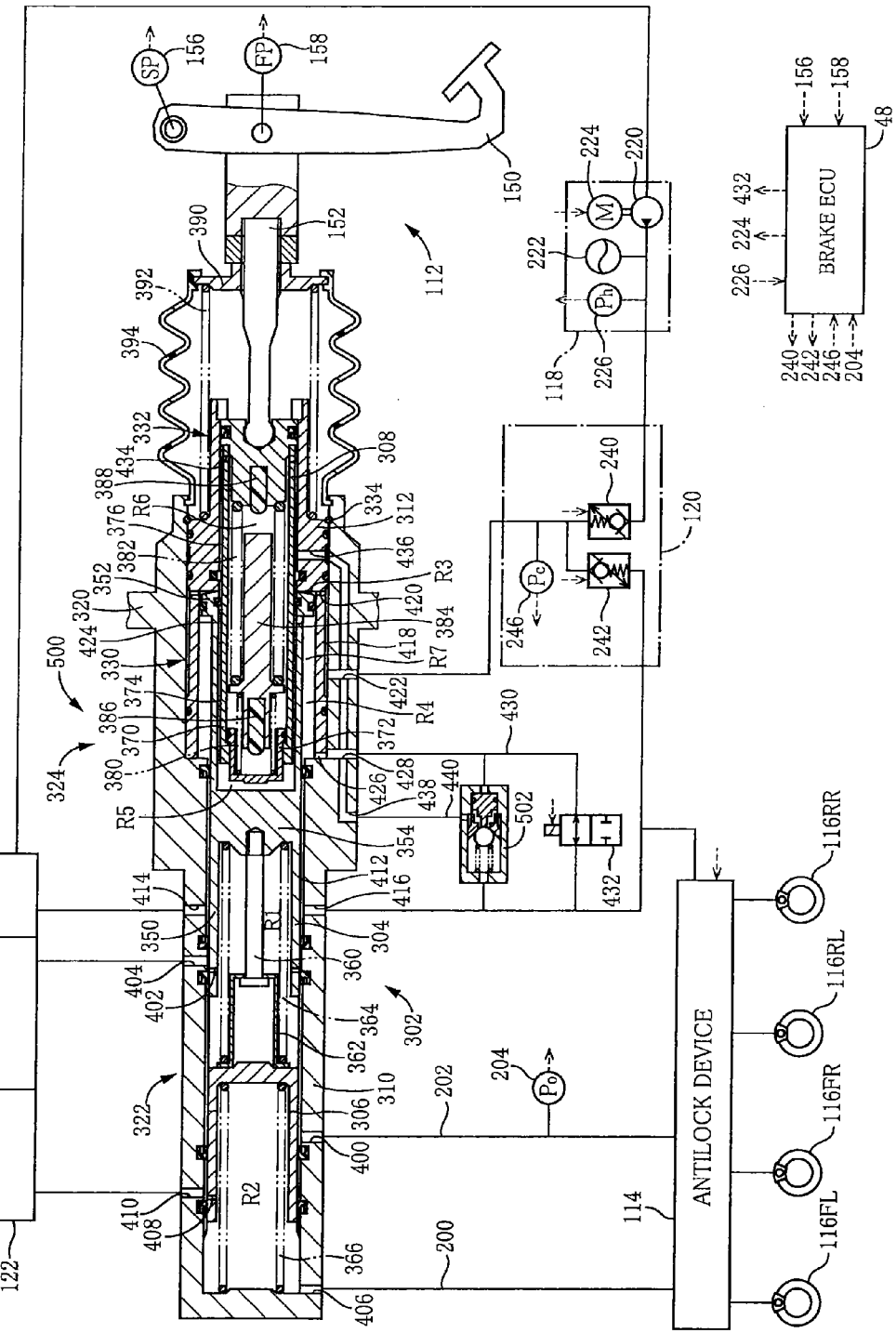
FIG. 4 is a view of a hydraulic brake system including a master cylinder device of a modified embodiment of the first embodiment.

FIG. 4 illustrates the hydraulic brake system 100 having a master cylinder device 500 of the modified embodiment substituting for the master cylinder device 110 of the first embodiment. Generally speaking, the master cylinder device 500 has the same structure as the master cylinder device 110 of the first embodiment except for having a mechanical open/close valve 502 substituting for the electromagnetic open/close valve 442 provided in the middle of the external communication passage 440 of the master cylinder device 110 of the first embodiment. In the following explanation, centering on the open/close valve 502, only structure and actuation different from the master cylinder device 110 of the first embodiment are explained.

Figure 5:
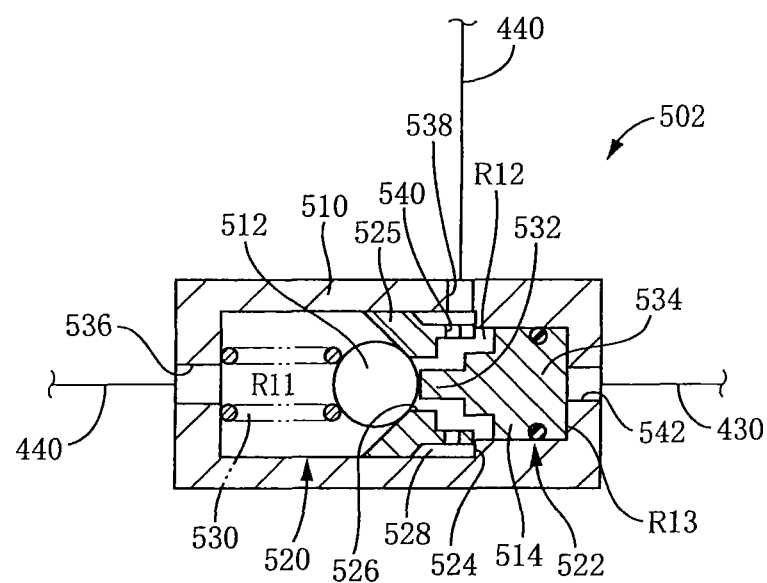
FIG. 5 is a view of a mechanical open/close valve employed in the master cylinder device of the modified embodiment of the first embodiment.

The open/close valve 502 is provided in the middle of the external communication passage 440. FIG. 5 is a cross sectional view of the open/close valve 502. The open/close valve 502 includes a housing 510 which is a casing, and a valve body member 512 and a plunger 514 which are disposed inside the housing 510. The housing 510 has a shape like a tube whose both ends are closed. Inside the housing 510, there are formed a large inner diameter portion 520 having a large inner diameter and a small inner diameter portion 522 having a small inner diameter. In a border between the diameter portions 520 and 522, there is formed a stepping face 524. In the large inner diameter portion 520 of the housing 510, there is fixedly fitted a separation member 525 having a roughly column shape in a state in which the separation member 525 abuts on the stepping face 524. It is noted that there is provided a communication hole 526 in the center of the separation member 525. A part of the separation member 525 which is on an outer circumference thereof and close to the stepping face 524, has a small outer diameter. Therefore, between the large inner diameter portion 520 of the housing 510 and the separation member 525, there is provided a clearance.

In the large inner diameter portion 520 of the housing 510, there is defined a liquid chamber R11 by the large inner diameter portion 520 and the separation member 525. In the liquid chamber R11, there are disposed the valve body member 512 having a spherical shape and a compression coil spring 530. The valve body member 512 is pushed to the communication hole 526 by an elastic reaction force of the spring 530 so as to close the communication hole 526. It is noted that a diameter of the valve body member 512 is larger than a diameter of the communication hole 526. Therefore, the separation member 525 functions as a valve seat, and the valve body member 512 can sit on the separation member 525, thereby closing the communication hole 526. In this state, the open/close valve 502 is in a close state. In the small inner diameter portion 522 of the housing 510, the plunger 514 having a roughly column shape is disposed. As regards the plunger 514, its one end is a tip portion 532 whose outer diameter is smaller than the diameter of the communication hole 526, and its other end is a bottom portion 534 whose outer diameter is slightly smaller than the inner diameter of the small inner diameter portion 522. Therefore, the plunger 514 is fitted in the inside of the housing 510 in a state in which the bottom portion 534 can slidably contact with the small inner diameter portion 522. Additionally, in front of the plunger 514, there is defined a liquid chamber R12 by the small inner diameter portion 522, the separation member 525, and the plunger 514, and in the rear of the plunger 514, there is defined a pilot pressure chamber R13 into which a brake fluid is introduced as a pilot pressure which is described below. It is noted that the pilot pressure chamber R13 is illustrated in an almost squeezed state in FIG. 5. In addition, the liquid chamber R12 can communicate with the liquid chamber R11 through the communication hole 526.

In the large inner diameter portion 520 of the housing 510, there is provided a communication hole 536 whose one end opens to the liquid chamber R11 and whose other end is a connection port. In the vicinity of the stepping face of the large inner diameter portion 520, there is provided a communication hole 538 whose one end opens to the clearance 528 and whose other end is a connection port. Moreover, in the separation member 525, there is provided a communication hole 540 for a communication between the clearance 528 and the liquid chamber R12. Furthermore, in the small inner diameter portion 522 of the housing 510, there is provided a communication hole 542 whose one end opens to the pilot pressure chamber R13 and whose other end is a connection port.

The above constructed open/close valve 502 is connected to the external communication passage 440 at the respective connection ports of the communication holes 536, 538. That is, it is possible to say that the communication hole 536, the liquid chambers R11, R12, the communication hole 540, the clearance 528, and the communication hole 538 constitute a part of the external communication passage 440. Through the external communication passage 440, the communication port 438 of the master cylinder device 500 can communicate with the reservoir 122. In addition, since a communication passage diverging from the external communication passage 430 is connected to the connection port of the communication hole 542, a brake fluid having the same pressure as the brake fluid in the reaction force chamber R7 is supplied to the communication hole 542. As a result, the tip portion 532 of the plunger 514 can advance through the communication hole 526 according to the pressure of the brake fluid in the reaction force chamber R7, whereby the plunger 514 can be activated to push the valve body member 512. When a force for pushing the valve body member 512 becomes larger than a force of the compression spring 530 for pushing the valve body member 512, the plunger 514 can separate the valve body member 512 from the communication hole 526. In this state, the open/close valve 502 is in an open state.

The following explanation is regarding actuation of the master cylinder device 500. In the normal condition, the open/close valve 432 is energized to be in the close state, whereby the reaction force chamber R7 is hermetically closed. When a brake operation is performed in this state, the pressure in the reaction force chamber R7 increases. Accordingly, in the open/close valve 502, since the valve body member 512 separates away from the communication hole 526, the open/close valve 502 comes into the open state, whereby, a state in which the liquid chamber R11 and the liquid chamber R12 communicate with each other, that is, a state in which the internal chamber R5 communicates with the reservoir 122 is realized. Thus, in the normal condition, the master cylinder device 500 can be actuated in the high-pressure-source-pressure dependent pressurizing state.

In the open/close valve 502 of the master cylinder device 500, a pressurized area of the bottom portion 534 of the plunger 514 on which a pressure of the brake fluid acts is set comparatively large. Therefore, the open/close valve 502 is constructed to open when the brake fluid in the reaction force chamber R7 increases slightly. Accordingly, in the master cylinder 500, owing to the open/close valve 502, immediately after a beginning of a brake operation, that is, when the pressure of the brake fluid in the reaction force chamber R7 increases slightly, the internal chamber R5 can communicate with the reservoir 122.

On the other hand, in the electric failure condition, the open/close valve 432 is put in the close state. Therefore, the pressure of the brake fluid in the reaction force chamber R7 and the external communication passage 430 is at the atmospheric pressure, and thus the pressure of the brake fluid in the pilot chamber R13 is also at the atmospheric pressure. Accordingly, in the electric failure condition, there is no possibility that the valve body member 512 separates away from the communication hole 526. In other words, the open/close valve 502 is maintained in the close state, whereby the communication of the internal chamber R5 with the reservoir 122 is shut off. Accordingly, the master cylinder device 500 can be actuated in the operation-force dependent pressurizing state.

It is noted that the open/close valve 502 is constructed not to open by the pressure of the brake fluid in the internal chamber R5 even when the master cylinder device 500 is put in the operation-force dependent pressurizing state and the pressure of the brake fluid in the internal chamber R5 acts on a brake fluid in the liquid chamber R12. More specifically, the open/close valve 502 is constructed such that an area of a portion of the valve body member 512 on which the pressure of the brake fluid in the liquid chamber R12 acts is set considerably small, and thus, a force which pushes the valve body member 512 to shift it from the separation member 525 never become larger than the force which is generated by the spring 530 and pushes the valve body member 512 onto the separation member 525. Therefore, the open/close valve 502 is maintained in the close state in the operation-force dependent pressurizing state.

Thus, the pressure of the brake fluid in the reaction force chamber R7 is introduced into the open/close valve 502 as a pilot pressure, and the open/close valve 502 functions as an internal-chamber-communication shut-off device which is activated to open when the pilot pressure is not less than a predetermined pressure which is determined depending on the elastic reaction force of the compression spring 530 and close when the pilot pressure is less than the predetermined pressure. Thus, in the master cylinder device 500, the internal-chamber-communication shut-off device is constructed with a comparatively simple mechanism.

Second Embodiment

Figure 6:
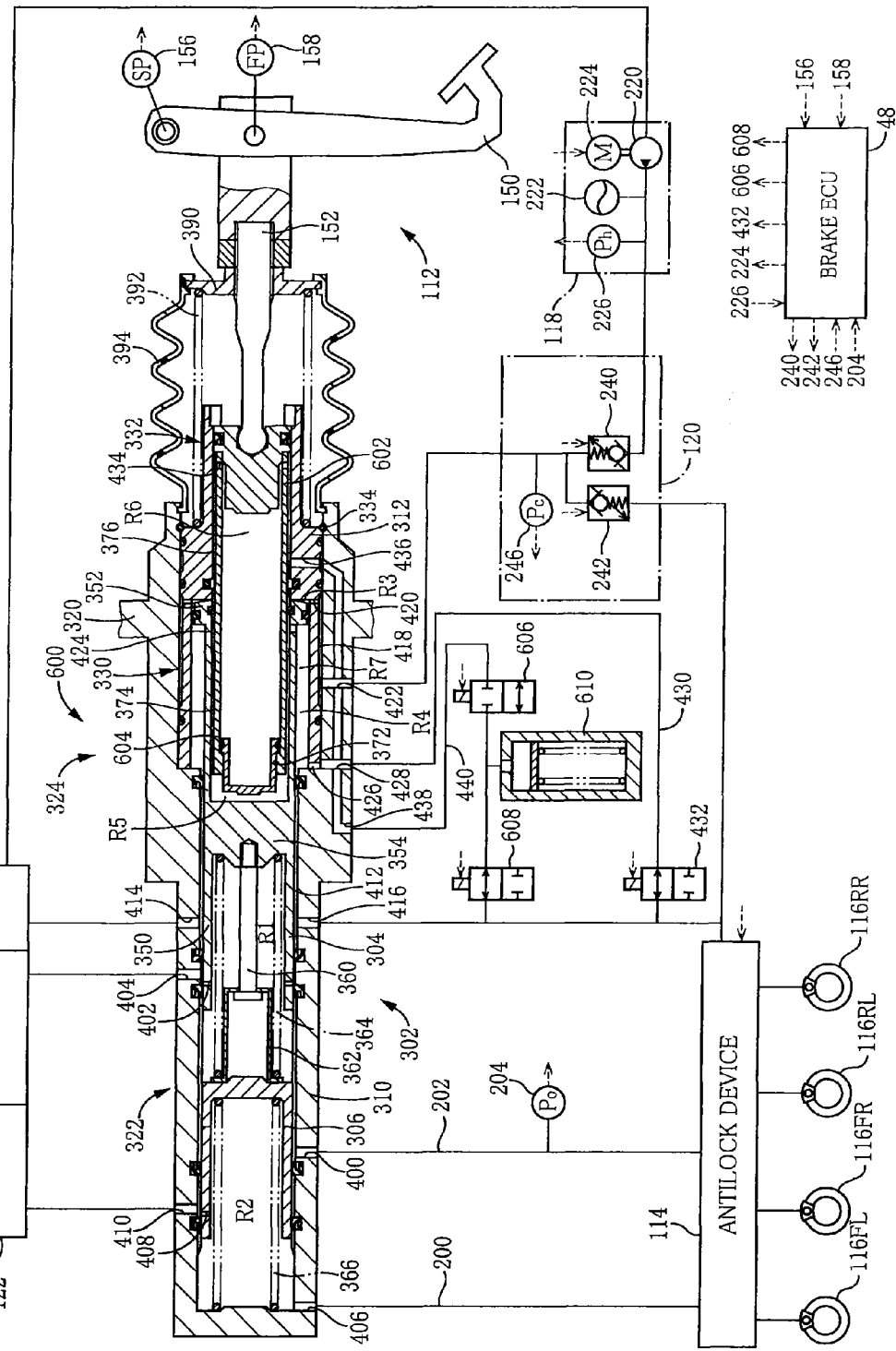
FIG. 6 is a view of a hydraulic brake system including a master cylinder device of a second embodiment according to the claimable invention.

FIG. 6 illustrates the hydraulic brake system 100 having a master cylinder device 600 of the second embodiment substituting for the master cylinder device 110 of the first embodiment. Generally speaking, the master cylinder device 600 has the same structure as the master cylinder device 110 of the first embodiment. In the following explanation, in the interest of brief description, only structure and actuation different from the master cylinder device 110 of the first embodiment are explained An input piston 602 of the master cylinder device 600 has a structure in which the springs etc. provided in the input piston 308 of the master cylinder device 110 of the first embodiment are removed. Additionally, in the master cylinder device 600, on the external communication passage 440, there are provided an electromagnetic open/close valve 606 being a normally close valve and an electromagnetic open/close valve 608 being a normally open valve. In the master cylinder device 600, there is provided an external type stroke simulator 610 between those open/close valves.

Figure 7:
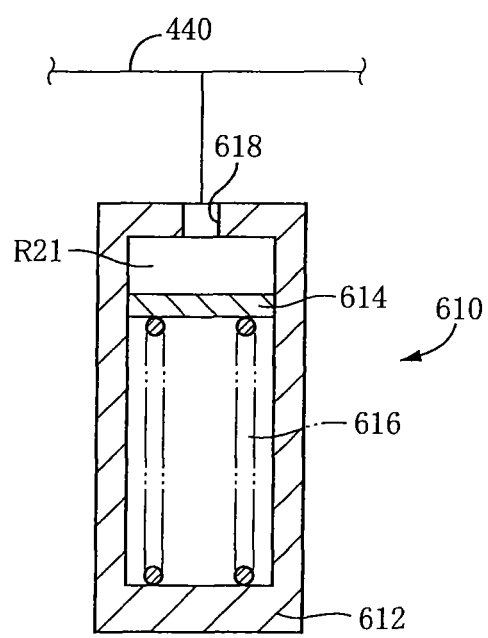
FIG. 7 is a view of a reaction force generating mechanism employed in the master cylinder device of the second embodiment.

FIG. 7 is a cross sectional view of the stroke simulator 610. The stroke simulator includes a housing 612 which is a casing, and a pressurizing piston 614 and a compression coil spring 616 which are disposed inside the housing 612. The housing 612 has a shape like a tube whose both ends are closed. The pressurizing piston 614 is shaped like a disk and disposed such that the pressurizing piston 614 can slidably contact with an inner circumferential face. As regards the spring 616, its one end is supported by an inner bottom face of the housing 612 and the other end is supported by one end face of the pressurizing piston 614. Accordingly, the pressurizing piston 614 is elastically supported by the housing 612 with using the spring 616. Inside the housing 612, there is defined a liquid chamber R21 by the other end face of the pressurizing piston 614 and the housing 612. Moreover, in the housing 612, there is provided a communication hole 618 whose one end opens to the liquid chamber R21 and whose other end is a connection port. To the connection port of the communication hole 618, a communication passage diverging from the external communication passage 440 is connected. Therefore, the liquid chamber R21 can communicate with the internal chamber R5.

A brake fluid in the liquid chamber R21 is elastically pressurized by the spring 616 via the pressurizing piston 614. When the input piston 602 shrink in a state in which the liquid chamber R21 communicates with the internal chamber R5, the brake fluid in the internal chamber R5 can flow into the liquid chamber R21 thorough the external communication passage 440. When a volume of the liquid chamber R21 increases due to the inflow of the brake fluid, the pressurizing piston 614 compresses the spring 616, whereby the elastic reaction force applied from the spring 616 to the brake fluid increases. Thus, the stroke simulator 610 includes the liquid chamber R21 whose volume change is allowed and a spring 616 as a pressurizing mechanism for pressurizing the brake fluid, and functions as a reaction force generating mechanism for generating an elastic reaction force against the shrink of the input piston 602.

In the master cylinder device 600 constructed above, the open/close valve 606 and the open/close valve 608 are energized in the normal condition to be opened and closed, respectively. Accordingly, the internal chamber R5 communicates with the stroke simulator 610 via the open/close valve 606, and the communication of the internal chamber R5 and the stroke simulator 610 with the reservoir 122 is shut off. Therefore, when the brake pedal 150 is operated by the driver and the input piston shrinks, the elastic reaction force of the spring 616 of the stroke simulator 610 increases. Thus, in the normal condition, the driver can realistically feel the elastic reaction force as an operation reaction force whose magnitude varies according to a brake operation by the driver, and thus, the master cylinder device 600 can be actuated in the high-pressure-source-pressure dependent pressurizing state. Incidentally, since the stroke simulator 610 includes a single spring, the change of the operation reaction force with respect to the operation amount is not consistent with the graph illustrated in FIG. 3. The operation reaction force changes in an approximately fixed proportion with respect to the operation amount. That is, the operation reaction force inclination is an approximately constant value.

Under the condition in which electric power is not supplied to the hydraulic brake system 100 due to an electric failure, the open/close valve 606 and the open/close valve 608 are not-energized to be closed and opened, respectively. Therefore, since the communication of the internal chamber R5 with the stroke simulator 610 is shut off by the open/close valve 606, the internal chamber R5 is hermetically closed. That is, the open/close valve 606 functions as an internal-chamber-communication shut-off device for shutting off the communication of the internal chamber R5 with the liquid chamber R21 and also functions as an input-piston-shrink prohibiting mechanism for prohibiting the shrink of the input piston 602 by hermetically closing the internal chamber R5. Therefore, the master cylinder device 600 can be actuated in the operation-force dependent pressurizing state.

Incidentally, in the electric failure condition, the stroke simulator 610 is communicated with the reservoir 122 by the opening of the open/close valve 608. In addition, when an ignition is turned to OFF, the open/close valve 608 is not-energized to be opened, and thus the stroke simulator 610 communicates with the reservoir 122. As regards the master cylinder device 610, in an brake operation in the normal condition, there is a possibility that a pressure remains in the brake fluid in the liquid chamber R21, for example, due to leakage of the brake fluid inside the master cylinder device 610. Such a remaining pressure may prevent an appropriate actuation of the stroke simulator 610. The master cylinder device 600 can relieve such a remaining pressure by regularly communicating the liquid chamber R21 with the reservoir 122.

By the way, a stroke simulator employed in the master cylinder device 600 may be a so-called diaphragm type stroke simulator. That is, a stroke simulator in which the liquid chamber R21 is defined by not the pressurizing piston 614 but a diaphragm and the brake fluid is pressurized by the pressurizing mechanism via the diaphragm, may be employed.

Moreover, in the master cylinder device 600, the mechanical open/close valve 602 employed in the master cylinder device 500 of the modified embodiment of the first embodiment may be employed as an internal-chamber-communication shut-off device substituting for the electromagnetic open/close valve 606. Where the open/close valve 602 is employed, the open/close valve 602 may be arranged on the external communication passage 440 and between the connection port of the communication hole 438 and the stroke simulator 610, and the pressure of the brake fluid in the reaction force chamber R7 may be introduced as a pilot pressure from the external communication passage 430. The open/close valve 602 arranged thus can be activated to come into an open state in the normal condition and a close state in the electric failure condition.

REFERENCE SIGNS LIST

110: master cylinder device 116: brake device 118: high-pressure-source device (high pressure source) 122: reservoir 150: brake pedal (operation member) 302: housing 304: first pressurizing piston (pressurizing piston) 308: input piston 350: body portion 352: flange portion 370: rear side member 372: front side member 380: first reaction force spring (reaction force generating mechanism) 382: reaction force spring (reaction force generating mechanism) 384: floating seat (reaction force generating mechanism) 424: communication hole (inter-chamber communication passage) 432: electromagnetic open/close valve (low-pressure-source communicating device) 442: electromagnetic open/close valve (input-piston-shrink prohibiting mechanism) R1: first pressurizing chamber R3: input chamber R4: opposing chamber R5: internal chamber R6: inter-piston chamber 500: master cylinder device 502: mechanical open/close valve (input-piston-shrink prohibiting mechanism) 600: master cylinder device 606: electromagnetic open/close valve (input-piston-shrink prohibiting mechanism) 610: stroke simulator (reaction force generating mechanism) 616: compression coil spring (pressurizing mechanism) R21: liquid chamber.

The invention claimed is:

1. A master cylinder device which supplies a pressurized brake fluid to a brake device provided in a wheel and actuated by a pressure of the brake fluid, comprising:
   a housing whose front side is closed;
   a pressurizing piston having a blind hole opening at a rear end thereof, which includes a main body portion, and a flange portion formed around an outer circumference of the main body portion, and which is disposed in the housing such that: in front of the main body portion, there is defined a pressurizing chamber for pressurizing the brake fluid to be supplied to the brake device; in the rear of the flange portion, there is defined an input chamber into which a brake fluid is introduced from a high pressure source and which has a ring shape; and, in front of the flange portion, there is defined an opposing chamber filled with a brake fluid, opposing to the input chamber with the flange portion interposed therebetween, and having a ring shape;

an input piston which is fitted in the blind hole of the pressurizing piston such that, in front of the input piston and between the input piston and the pressurizing piston, there is defined an inter-piston chamber filled with a brake fluid, which is connected to an operation member at a rear end portion thereof, and which is allowed to shrink by operating the operation member;

a reaction force generating mechanism for generating an elastic reaction force against the shrink of the input piston; and an inter-chamber communication passage for making the opposing chamber and the inter-piston chamber communicate with each other so as to enable a mutual absorption of respective volume changes of the opposing chamber and the inter-piston chamber, the volume changes being caused by a forward and a rearward movements of the pressurizing piston, wherein the master cylinder device is configured such that, normally, in a state in which the opposing chamber and the inter-piston chamber communicating with each other by the inter-chamber communication passage are hermetically closed and an operation force applied to the operation member is not transmitted from the input piston to the pressurizing piston, the pressurizing piston pressurizes the brake fluid in the pressurizing chamber depending on a pressure of the brake fluid introduced from the high pressure source while the elastic reaction force generated by the reaction force generating mechanism is permitted to serve as an operation reaction force against an operation of the operation member, wherein the master cylinder device further comprises an operation-force-dependent-pressurization realizing mechanism which, under a condition in which the pressure of the brake fluid introduced from the high pressure source is insufficient, allows the transmission of the operation force from the input piston to the pressurizing piston, thereby realizing a pressurization of the brake fluid in the pressurizing chamber that depends on the operation force, and wherein the operation-force-dependent-pressurization realizing mechanism includes:
  a low-pressure-source communicating device for making the opposing chamber and the inter-piston chamber communicate with a low pressure source so as to allow the input piston to come into abutting contact with the pressurizing piston; and
  an input-piston-shrink prohibiting mechanism for prohibiting the shrink of the input piston.

2. The master cylinder device according to claim 1, wherein the input piston includes two members one of which is fitted in the other of which such that an internal chamber filled with a brake fluid is defined inside the input piston, and is allowed to shrink by that a relative movement of the two members is allowed, and
wherein the input-piston-shrink prohibiting mechanism is configured to hermetically close the internal chamber so as to prohibit the shrink of the input piston.

3. The master cylinder device according to claim 2, wherein the input piston is allowed to shrink by that the internal chamber communicates with the low pressure source, and wherein the input-piston-shrink prohibiting mechanism includes an internal-chamber-communication shut-off device for shutting off the communication of the internal chamber with the low pressure source so as to hermetically close the internal chamber.

4. The master cylinder device according to claim 3, wherein the internal-chamber-communication shut-off device includes a mechanical open/close valve which is disposed on a communication passage connecting the internal chamber and the low pressure source, into which a pressure of the brake fluid in the opposing chamber and the inter-piston chamber is introduced as a pilot pressure, and which opens when the pilot pressure is not less than a predetermined pressure and closes when the pilot pressure is less than the predetermined pressure.

5. The master cylinder device according to claim 3, wherein the internal-chamber-communication shut-off device includes an electromagnetic open/close valve disposed on a communication passage connecting the internal chamber and the low pressure source.

6. The master cylinder device according to claim 3, wherein the reaction force generating mechanism is disposed in the internal chamber and includes a spring for biasing the two members in a direction that the input piston stretches.

7. The master cylinder device according to claim 6, wherein the reaction force generating mechanism includes two springs each of which functions as the spring, which are arranged in series in a state in which one end portion of one of the two springs is supported by one of the two members, and one end portion of the other of the two springs is supported by the other of the two members, and whose spring constants are different from each other, and a floating seat disposed between the other end portion of the one of the two springs and the other end portion of the other of the two springs, floatingly supported by the two springs, and connecting the two springs so as to apply elastic reaction forces of the two springs to the two members.

8. The master cylinder device according to claim 2, wherein the reaction force generating mechanism includes:
a liquid chamber which communicates with the internal chamber and is filled with a brake fluid, and whose volume change is allowed; and a pressurizing mechanism for elastically pressurizing the brake fluid in the liquid chamber, and wherein the input-piston-shrink prohibiting mechanism includes an internal-chamber-communication shut-off device for shutting off the communication of the internal chamber with the liquid chamber so as to hermetically close the internal chamber.

9. The master cylinder device according to claim 1, wherein the low-pressure-source communicating device includes an electromagnetic open/close valve disposed on a communication passage connecting the opposing chamber and the inter-piston chamber to the low pressure source.

10. The master cylinder device according to claim 1, wherein the master cylinder device is configured such that, when the operation member is not operated, an front end of the input piston and a bottom portion of the blind hole of the pressurizing piston are apart from each other.

11. The master cylinder device according to claim 10,
wherein a distance between the front end of the input piston and the bottom portion of the blind hole of the pressurizing piston is not more than one-fifth of an internal diameter of the blind hole.

12. The master cylinder device according to claim 1,
wherein the master cylinder device is configured such that a pressurized area of the flange portion on which a pressure of the brake fluid in the opposing chamber acts and a pressurized area of the input piston on which a pressure of the brake fluid in the inter-piston chamber acts are equal.

* * * * *